United States Patent [19]

Caron et al.

[11] Patent Number: 4,729,174
[45] Date of Patent: Mar. 8, 1988

[54] METHOD OF DETERMINING CIRCULARITY AND MEAN RADIUS OF CLOSED CURVED SURFACE

[75] Inventors: Paul R. Caron, Tiverton, R.I.; Gilbert Fain, Freetown; Lee E. Estes, Mattapoisett, both of Mass.

[73] Assignee: PGL Corporation, Westport, Mass.

[21] Appl. No.: 885,867

[22] Filed: Jul. 15, 1986

[51] Int. Cl.⁴ ............................................. G01B 5/08
[52] U.S. Cl. ...................................... 33/504; 33/228; 33/178 E
[58] Field of Search ............ 33/178 E, 178 D, 178 R, 33/504, 551, 552, 553, 228

[56] References Cited

U.S. PATENT DOCUMENTS 3,352,014 11/1967 Kehke ................................... 33/228
3,479,744 11/1969 Howland et al. ................. 33/551 X
4,141,149 2/1979 George et al. ................. 33/178 D X
4,389,788 6/1983 Balogh et al. ................. 33/178 E X Primary Examiner—William D. Martin, Jr.
Attorney, Agent, or Firm—Samuels, Gauthier, Stevens & Kehoe

[57] ABSTRACT

A device (gage, data station, and software) and method to measure mean radius and deviations from mean radius of nominally cylindrical or conical shapes in a plane perpendicular to the nominal axis of revolution using curvature measurements at uniformly spaced intervals about the circumference is described. The system divides the contour of interest into equal segments and measures the local curvature at each point. The group of measurements combines with a closure constraint to produce a condition of mathematical overcompleteness. This is used to minimize the accumulation of measurement error.

19 Claims, 17 Drawing Figures

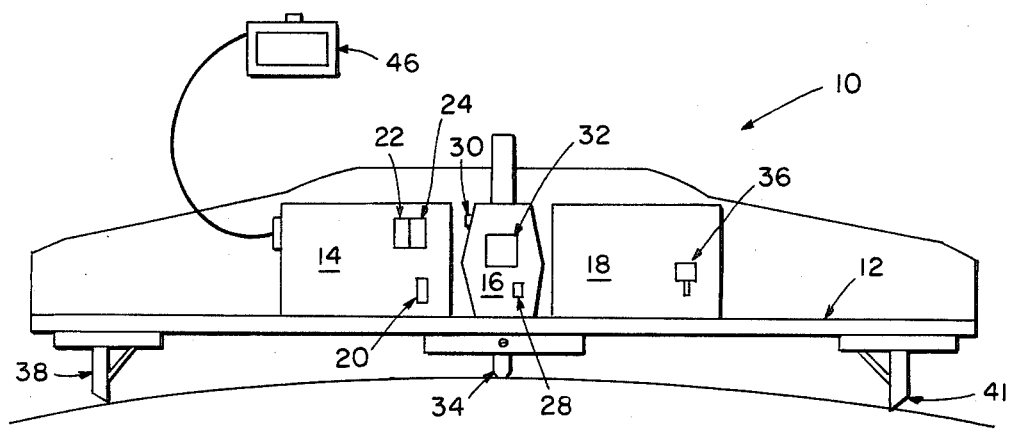
FIG. 2
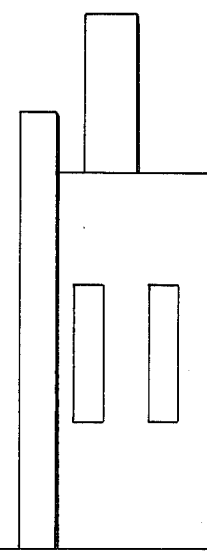
FIG. 3
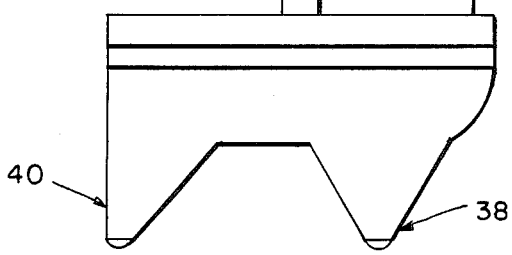
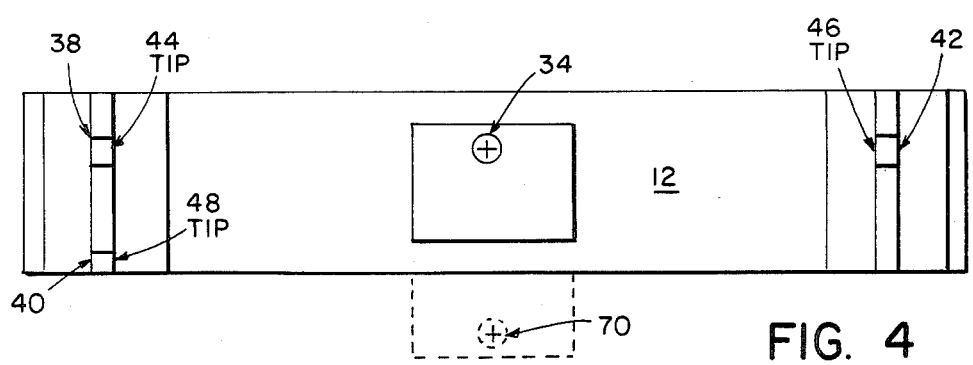
FIG. 4

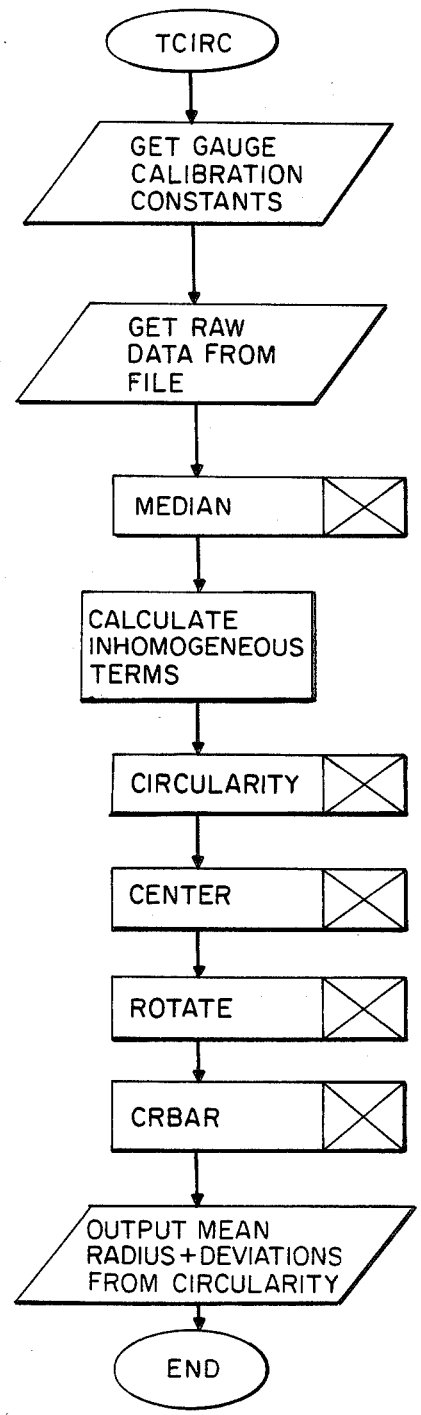
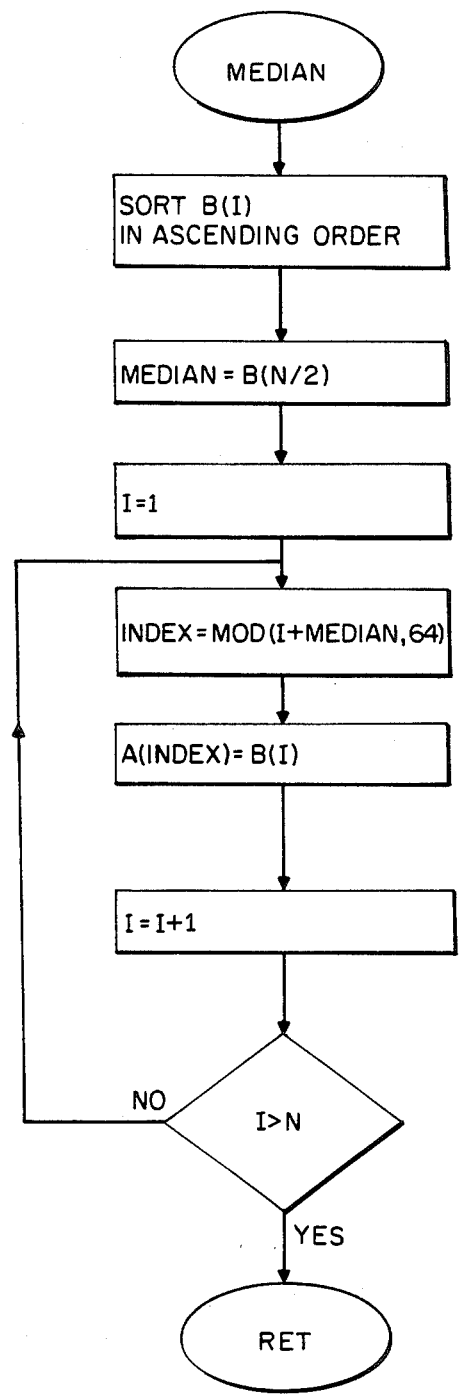
FIG. 9          FIG. 10

METHOD OF DETERMINING CIRCULARITY AND MEAN RADIUS OF CLOSED CURVED SURFACE

BACKGROUND AND BRIEF SUMMARY OF THE INVENTION

The invention is directed to a method and apparatus for measuring the circularity and mean radius of nominally cylindrical and/or tapered objects.

For large submersible vessels which are subject to extreme pressures, it is extremely important that the cross sectional configuration of the hull be as nearly circular as possible to minimize any possible abberations or weak points or regions in the surface of the hull which could produce a collapse under pressure.

Several prior art systems have been developed to measure circularity. One such systems entails the taking of a plurality of measurements of internal radii to locate the true center of the supposedly circular hull. The measured radii are then processed through a least mean squares fit program to create a circle that locates a center which enables one to determine the best fit circle. This then determines if the cross sectional circularity of the vessel hull is or is not within tolerance. The problem with this technique is that it must be carried out when the hull is initially fabricated and completely empty, i.e., without internal bulkheads, equipment, etc., that might impede the taking of radii measurements. Thus, if subsequent distortions are caused during vessel construction, the likelihood is that they may go undetected, at least by this technique.

Another prior art technique entails the positioning of a "true cylinder" around the vessel hull being measured. Measurements of circularity are made based on this "true cylinder". Here, the "true cylinder" sometimes undergoes distortion due to sagging, thereby causing inaccurate readings.

Still another prior art technique is based on photogrammetry. External markings are placed along a path defined by the intersection of a plane which is perpendicular to the vessel axis and which intersects the circumference on the vessel hull. A plurality of overlaping photographs are then taken along the aforesaid path and based on these photographs the distance between markings is determined and a calculation is made of the true circularity of the hull. The problem with this technique is that it requires an externally unobstructed view of the hull surface. Thus scaffoldings and other construction equipment must be cleared away, at considerable cost and inconvenience to the shipbuilder.

The present invention overcomes these prior art problems by providing a measurement gauge and method of measurement that is more accurate than prior art techniques and that may be employed at any stage of the vessel's construction, without regard to internal obstructions.

Broadly the invention comprises a method for determining the shape of a surface wherein the surface is divided into a plurality of contiguous segments with the junction of adjacent segments defining stations. A reference plane is established which plane is perpendicular to a reference axis. The plane extends through the surface and the intersection of the plane with the surface defines the shape of the path which is to be measured. The curvature of each station is measured and the closure property of the surface is invoked. Subsequently, a deviation of each of the stations from the nominal shape of interest is determined.

In one aspect of the invention, the measurement of the shape of the surface includes digitizing the general curvature equation $$K(x) = \frac{y''}{[1 + (y')^2]^{3/2}}$$

to determine the deviations from the nominal shape of interest. In another aspect of the broad scope of the invention, the shape of the surface of interest is determined by using the perturbation theory about the nominal shape and then digitizing the result to determine the deviations from the nominal shape of interest.

The preferred embodiment of the invention includes determining the circularity of a curved surface surrounding a reference axis. A reference plane through a vessel is established which plane is perpendicular to the reference axis and which plane extends through the surface the intersection of the plane with the surface defining a curved path. The path is divided into a plurality of equal length contiguous segments with the junction of the adjacent segments defining stations. The deviation $b_i$ of each station is measured from a chord which extends between the preceeding and succeeding stations adjacent to the station. The curvature at each station is calculated and the closure property of the surface is invoked. The deviation of each of the stations from the best fit circle and the mean radius of the surface which is the radius of the best fit circle are determined.

The apparatus broadly comprises a gauge and a data collection station. The gauge includes a rigid frame having two mutually spaced support legs. The legs have hardened tapered feet and are separated by the nominal chord size between alternate stations. A gauge indicator is located at a point midway between the measurement feet. The gauge indicator measures the deviation ($b_i$) of the hull surface from a chord connecting the measurement feet. Preferably an offset steadying leg is secured adjacent to one of the support legs to provide a three point mount for the indicator gauge on the cylinder. An automatic data collector is used to accept data from the gauge indicator.

The data collection station basically comprises a CPU station which accepts the gauge data automatically or manually, processes the data and outputs the data.

The method and apparatus are also used for determining the circularity of tapered objects (having sloping surfaces) where the surface containing the closed curved path is not parallel to the reference axis but is at an angle to the reference axis. A correction factor is applied to the deviation measurements, $b_i$, to provide a value of $b_i$ that would be obtained if the measurement were made in the plane normal to the reference axis. The gauge is modified to include a second indicator offset from the first indicator. Both indicators are used to determine the slope between stations $i$ and $i-1$.

In another aspect of the preferred embodiment the determination of the mean radius is made by a technique which produces more accurate results then can be achieved with prior art techniques. Although this technique is used in the preferred embodiment it may also be used with other prior art techniques for the determination of deviations from the best fit circle.

BRIEF DESCRIPTION OF THE DRAWINGS

FIGS. 2 and 3 are front and side elevational views of the gauge shown in FIG. 1;

FIG. 4 is a bottom view of the gauge platform;

FIGS. 9-14 are flow charts for the programs for the data station for non-tapered surfaces.

DESCRIPTION OF THE PREFERRED EMBODIMENT

Figure 1:
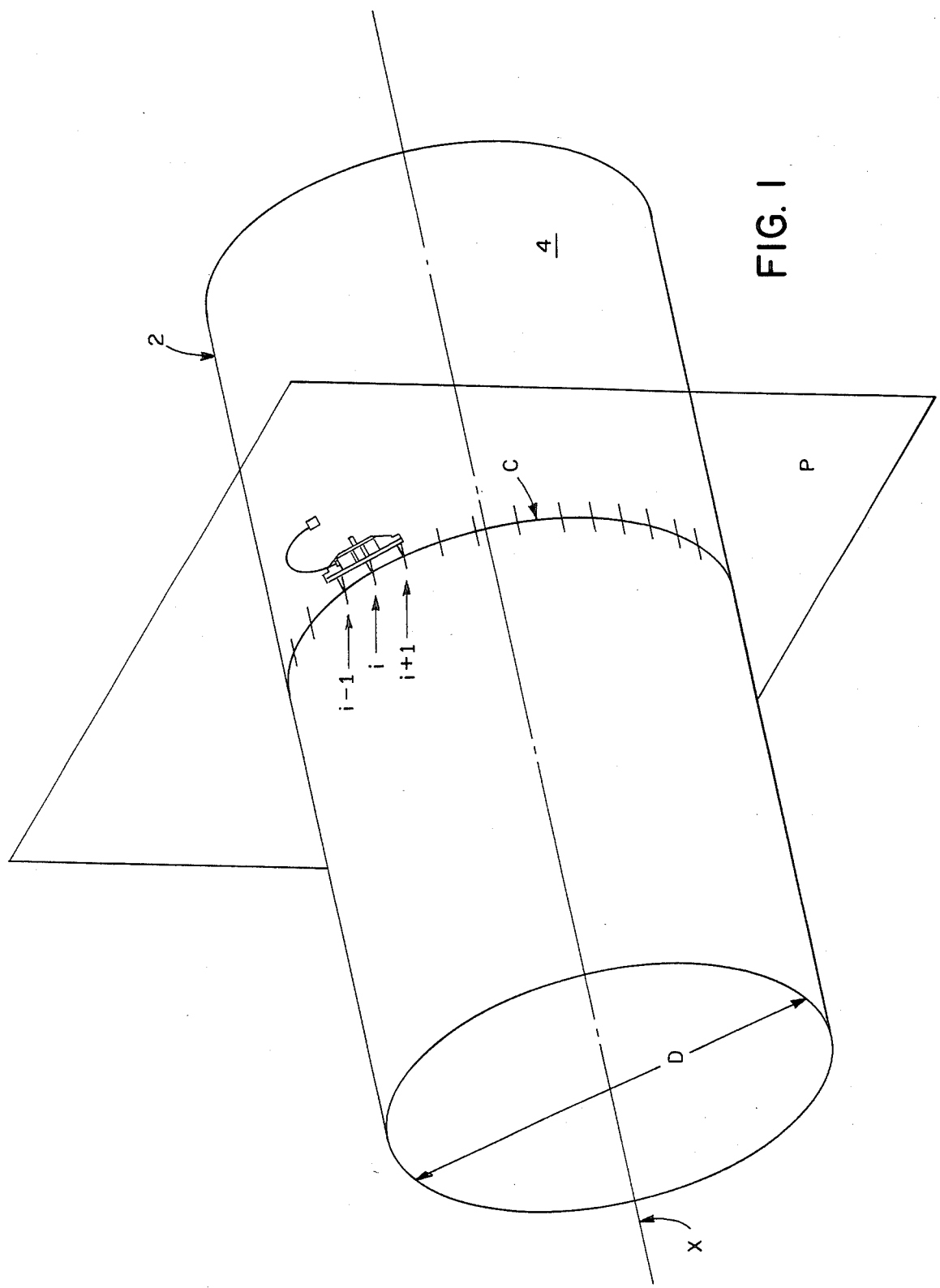
FIG. 1 is a perspective fragmentary schematic view of a cylindrical hull with a gauge in accordance with the present invention applied to its surface.

A preferred embodiment of the invention will now be described with initial reference to FIG. 1 which schematically depicts a cylindrical section of a submersible hull 2 having a nominal diameter of 42 feet. A reference plane P perpendicular to the longitudinal axis X of the hull 2 defines a circumference C where it intersects the hull wall 4.

Measurement Procedure

A calibrated metric tape is wrapped around the circumference C and the girth, G, is measured and recorded. The girth is divided into 64 evenly spaced stations "i" and these stations are marked on the cylinder wall to within ±3 mm (±⅛ inch) of the indicated position.

System Hardware

Referring to FIG. 2, a gauge 10 includes a platform 12 carrying a gauge computer 14, an indicator assembly 16, and a power supply 18.

The gauge computer 14, which may for example comprise a CMOS CPU Onset Computer Corp. Model CPU-8085, includes a mode thumbwheel 20, and two station thumbwheels 22 and 24.

The indicator assembly 16, such as for example a Mitutoyo 543-423-1, includes an indicator zero button 28, an indicator power switch 30, a display 32 and a sensor 34.

The power supply 18 comprises six 1.5 volt alkaline batteries, C size (not shown) and an on/of switch 36.

Referring further to FIGS. 3 and 4, one end of the platform 12 has a gauge measurement leg 38 and a steadying leg 40, and the other platform end has a gauge measurement leg 42. The measurement legs 38 and 42 terminate respectively in sharpened feet 44 and 46, and the steadying leg 40 terminates in a foot 48. The measurement feet 44 and 46 and the sensor 34 are aligned along the length of the platform.

Figure 5:
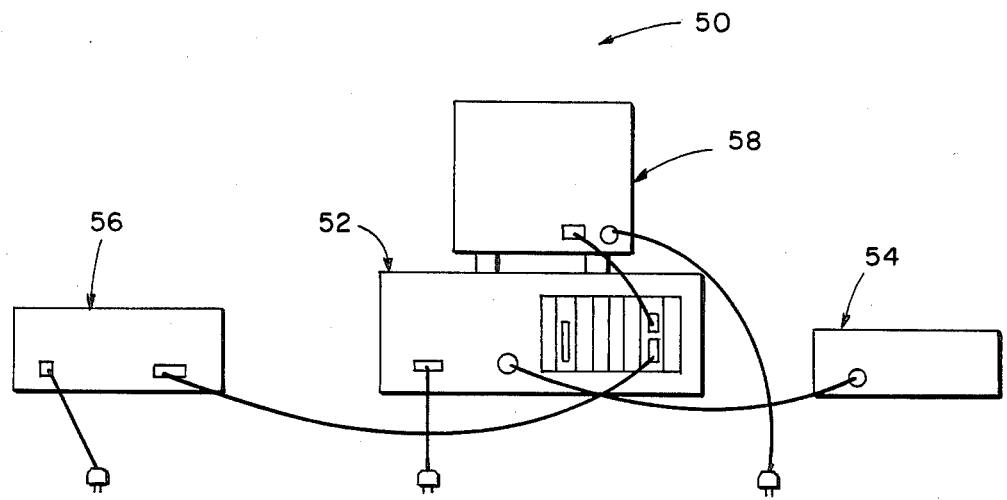
FIG. 5 is a functional block diagram of a data station.
Figure 6:
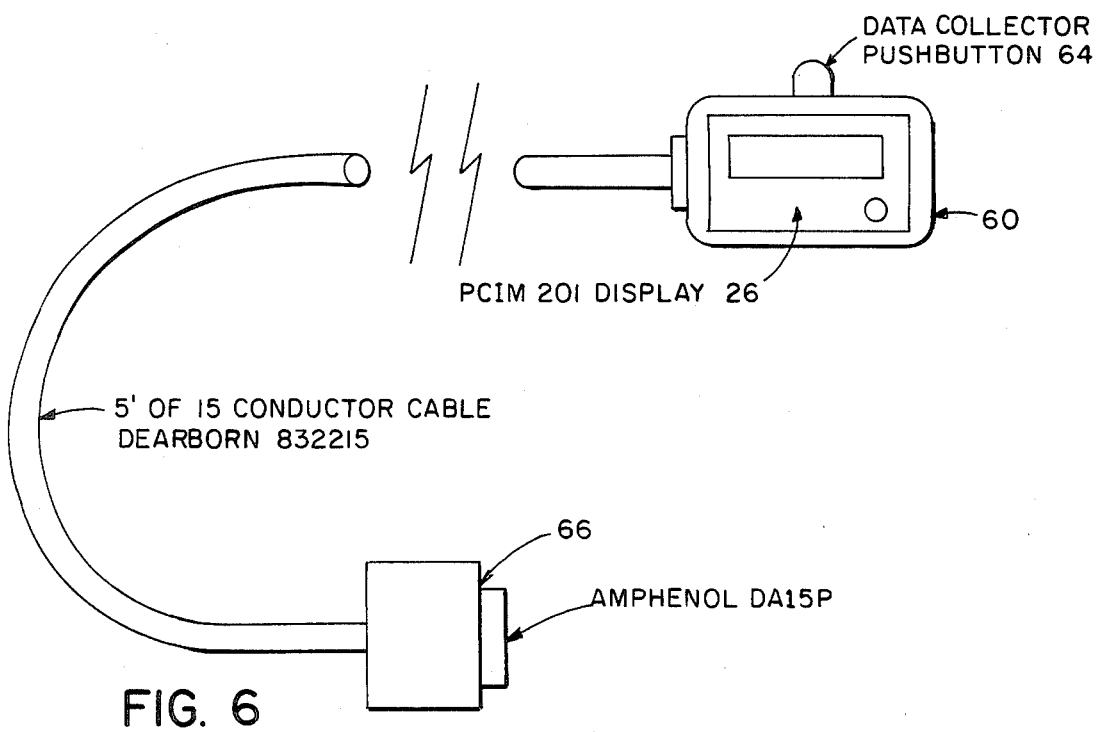
FIG. 6 is a schematic illustration of a data collection module.
Figure 7:
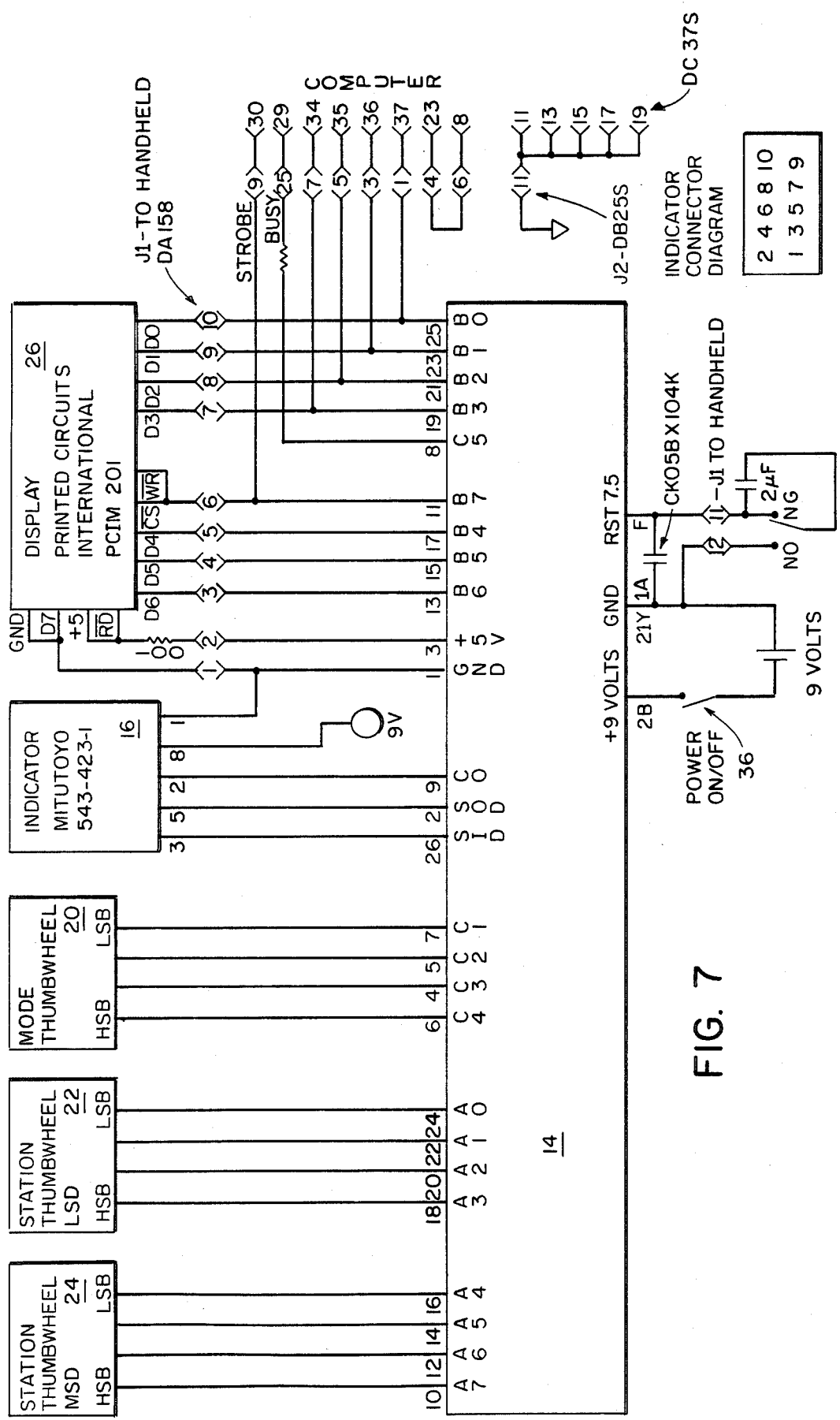
FIG. 7 is a schematic illustration of the interconnections between the data station and the gauge computer.

The gauge computer 14 communicates with both a data station 50 shown in FIG. 5 and a data collector module 60 shown in FIG. 6. The data station 50 comprises a CPU 52, such as an IBM XT, a keyboard 54 such as an IBM 5150, a printer 56 such as an EPSON RX 80 and a display 58 such as an IBM MONITOR.

The data collection module 60 shown in FIG. 6, comprises a PCIM 201 display 26, with a pushbutton 64, and a suitable connector 66 such as an Amphenol DA15P.

Operation

The programs described in the Appendix entitled Data Station Software are loaded into the CPU 52 and those entitled Gauge Computer Software are loaded into the gauge computer 14.

Prior to logging 6 station samples, the station thumbwheels 22 and 24 are set to the station to be measured. For station 8 thumbwheel 22 is set to zero, thumbwheel 24 is set to 8; for station 32 thumbwheel 24 is set to 1, and thumbwheel 22 is set to 3; etc. Stations are normally sampled in order. Any set of samples can be retaken by simply incrementing (or decrementing) the station thumbwheels by one and then returning the thumbwheels to the original position. Position 99 is used for data transfer.

Data Collection

Figure 8:
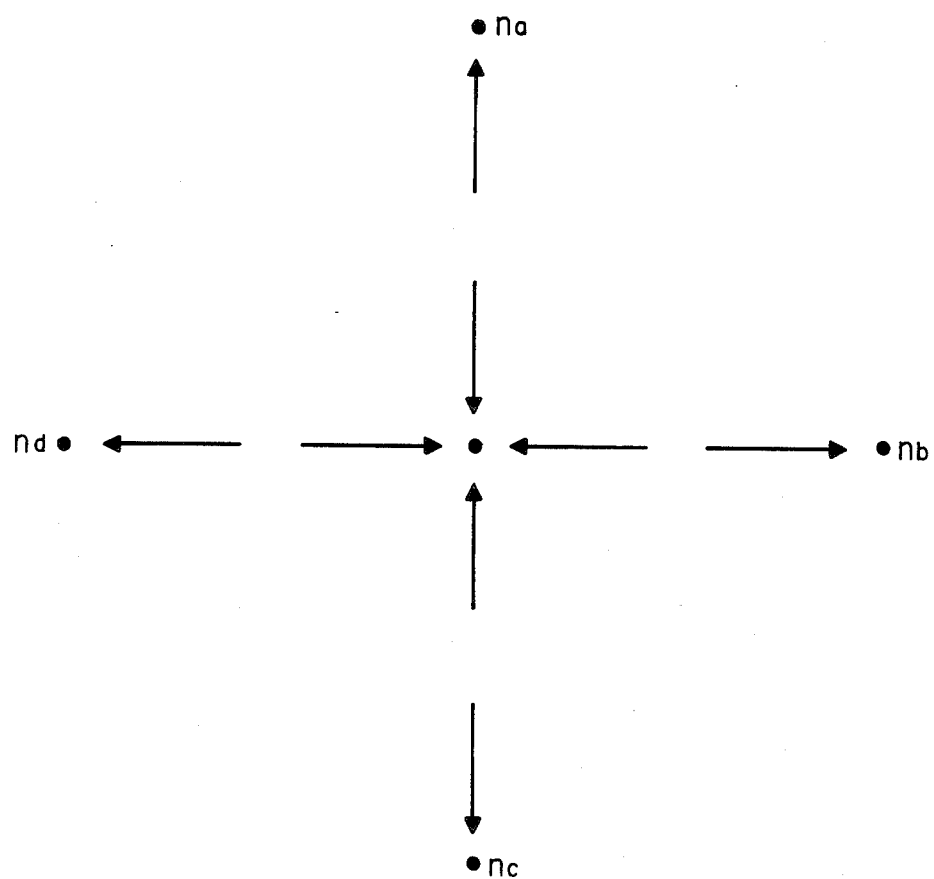
FIG. 8 is a schematic illustration of a data collection pattern.
Figures 11, 12:
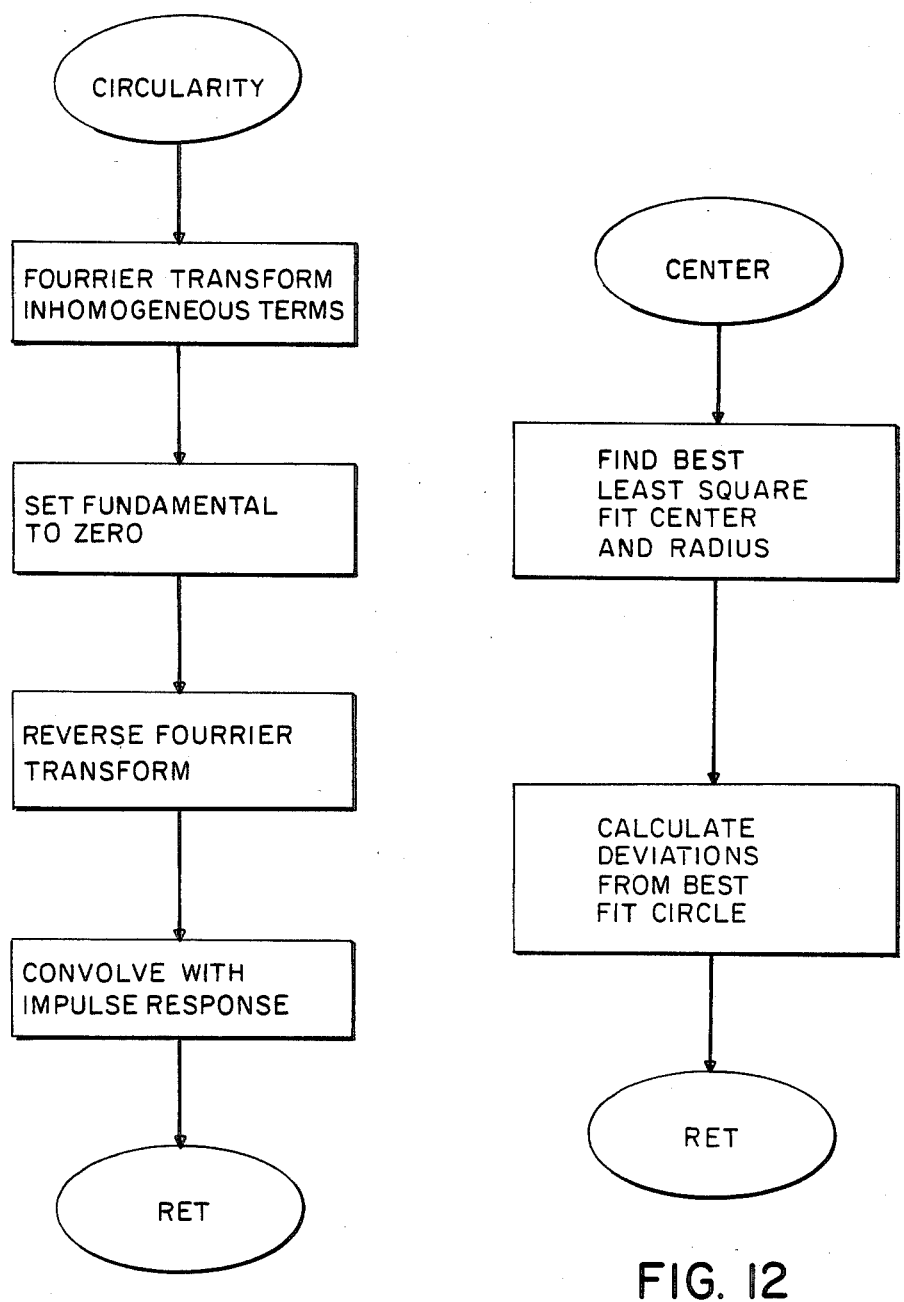
Figure 13:
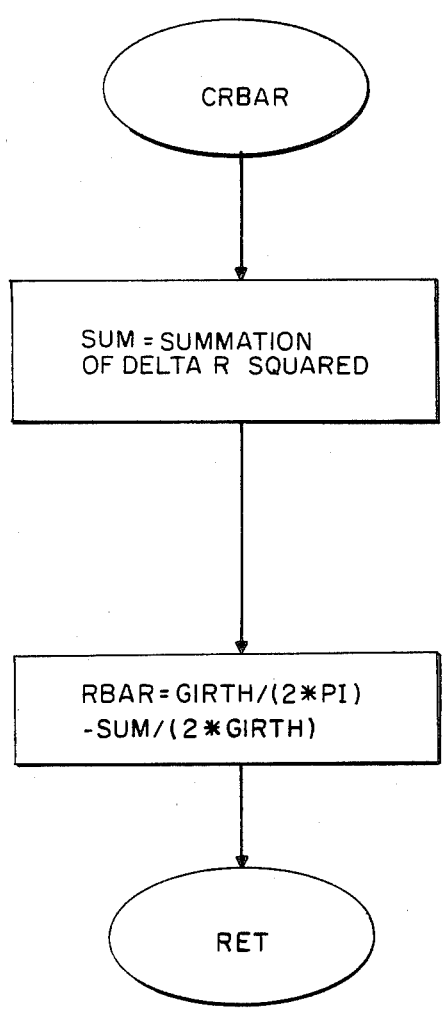
Figure 14:
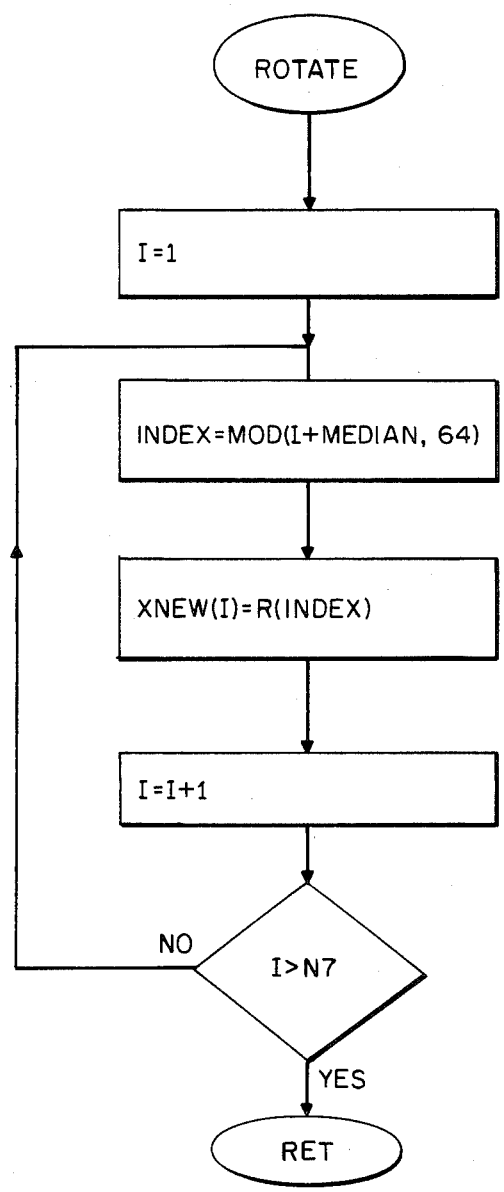

Again with reference to FIG. 1, measurements are taken at each station i by measurement foot tip 44 being placed directly on one adjacent station $i+1$ and resting the steadying leg 40 on the hull wall. Measurement foot tip 46 is placed in line with measurement foot tip 44 and near the other adjacent station $i-1$. The indicator sensor 34 contacts the hull wall near station i (the station recorded by the thumbwheels) and displays a reading ($b_i$) on the data display 26 of the hand held module 60. The data is recorded by depressing the data collection button 64. Four additional measurements $n_a$, $n_b$, $n_c$ and $n_d$ are made at station i by shifting the gauge slightly from the station in four 90° directions, as indicated in FIG. 8. The gauge 10 is then lifted from the station, allowing the indicator sensor 34 to return to its extended position and a sixth calibration data point is taken. This sequence is repeated at each of the remaining stations. The data is then transferred from the gauge 10 to the data station 50 using the program XFER.

Many hulls are constructed with openings in their surfaces; such as for hatches, bulkheads, etc. When the placement of the gauge legs or indicator(s) would be over such an open space, measurement points are physically introduced. Typically a structure, such as a plate or a bar, is secured across the opening with the surface of the structure lying in a plane which corresponds as closely as possible to the nominal circumference of the hull.

Computation of Data

After the data has been transferred, the curvature ($K_i$) is then calculated for each station in accordance with the equation $$K_i = \frac{2b_i}{A^2 + b^2_i}$$

where
i = the station number
A = one-half the length of said chord and $b_i$ is the average of $b_i$'s taken at each station.
The degenerate difference equation:

$$r_{i+1} + r_{i-1} - 2(\cos \Delta\theta) r_i = (\Delta\theta)^2 R_j^2 (K_i - K_j)$$

for each station is solved.
where:

$$\Delta\theta = \frac{2\pi}{\# \text{ of stations}}$$

i = station #
$K_j$ = median $K_i$
$R_j = 1/K_j$
$r_i = (R_i - R_j)$ and
$R_i$ = represents the surface measured.

The difference equation is solved after first having preprocessed the inhomogeneous terms $(K_i - K_j)$ to invoke the closure property of the surface. The preprocessing of $K_i - K_j$ consists of performing a Fourier transform on $(K_i - K_j)$, setting the fundamental Fourier component equal to zero and subsequently performing a digital inverse Fourier transform.

The solutions $r_i$ and $R_j$ are then used in a least square fit algorithm to produce a deviation ($\delta_i$) of each of the stations from the best fit circle including the mean radius of said surface which is the radius of the best fit circle.

This described method produces an estimate of mean radii which is adequate to produce high accuracy $\delta$'s.

In the preferred embodiment the $\delta_i$'s are combined with the girth measurement, G, according to $$R = \frac{G}{2\pi} - \frac{1}{2G} \Sigma_i \frac{\delta_i^2}{\Delta\theta}$$

to produce the final mean radii R; where (G) is the girth measurement of said surface along said path.

Alternatively, a more accurate value of the mean radius (R) of said curved surface may be determined by evaluating this equation with the use of any mechanism to determine the deviation from mean radius ($\delta_i$).

Software

Control of the computer is accomplished through instructions which are written in terms of the particular mode of operation desired. The computer thus has stored in its memory and disks, the programs or routines corresponding to each mode of operation of the computer. It is well known to those skilled in the art that the computer comprises suitable control, storage and computational units for performing various arithmetic and logical functions on data which it processes in digital form. Any standard computer language consistent with the capability of the computer can be used with the instructions. All subroutines are not described in detail, since they can be written with any desired notations, formats or sequence, depending upon the particular computer being utilized, computer language, etc. Programs and instructions described are put in terms of structural flow. When necessary and applicable for purposes of the invention, individual programs are described. The manufacturer's handbook sets forth the necessary programs which include the sequence of internal interconnections which have been added by the preparation and loading of the programs into the internal memory of the computer.

The various programs which are a part of the preferred embodiment of the invention are described generally in this section and are specifically set forth in the appendix. A DOS Operating System is used with the data station 50. The DOS manual dated 1985 ad the disk entitled "Exploring the IBM Personal Computer" dated 1983 are hereby incorporated by reference in their entireties in this disclosure. These programs are the system software and are used to generate data files containing the measured data and to generate, from these, files containing the mean radius and the deviations from mean radius. The latter files can be printed or plotted on an Epson RX 80. FIGS. 9-14 are charts of some of the basic programs stored in the data station 50. These programs are also set forth in the appendix.

The following programs comprise the operational software:

XFER

This program is used to transfer data from the gauge to the data station. This program generates a raw data file.

PRRAW

This program prints the raw data file generated using XFER and issues error indicators. After XFER this program must be run and the data inspected prior to turning the gauge off. The printed output is a necessary part of the measurement documentation. A typical output is shown below.

Sample raw data file printout using PRRAW

| GIRTH 132.00660 FEET = 402356 mm | | | | | | | |
|---|---|---|---|---|---|---|---|
| MAXIMUM DIFFERENCE IN STATION DATA = .0105 OCCURS AT STATION 59 | | | | | | | |
| MAXIMUM DIFFERENCE IN CAL DATA = .0001 | | | | | | | |
| STATION | FIRST | SECOND | THIRD | FOURTH | FIFTH | AVG (3) | CAL |
| 1 | .5234 | .5227 | .5235 | .5236 | .5209 | .5232 | −.2036 |
| 2 | .5343 | .5337 | .5347 | .5341 | .5375 | .5344 | −.2037 |
| 3 | .5238 | .5248 | .5198 | .5215 | .5220 | .5224 | −.2037 |
| 4 | .5418 | .5439 | .5458 | .5430 | .5436 | .5435 | −.2037 |
| 5 | .5280 | .5256 | .5284 | .5280 | .5288 | .5281 | −.2037 |
| 6 | .5033 | .5042 | .5024 | .5025 | .5034 | .5031 | −.2037 |
| 7 | .8274 | .8340 | .8301 | .8293 | .8035 | .8300 | −.2037 |
| 8 | .3155 | .3120 | .3153 | .3156 | .3153 | .3154 | −.2037 |
| 57 | .5001 | .4964 | .4958 | .4971 | .4999 | .4978 | −.2036 |
| 58 | .4320 | .4310 | .4338 | .4371 | .4318 | .4325 | −.2036 |
| 59 | .2942 | .2972 | .2884 | .2867 | .2938 | .2921 | −.2036 |
| 60 | .8683 | .8630 | .8680 | .8688 | .8652 | .8672 | −.2036 |
| 61 | .5065 | .5061 | .5070 | .5103 | .5061 | .5065 | −.2036 |
| 62 | .4823 | .4830 | .4835 | .4803 | .4816 | .4823 | −.2036 |
| 63 | .5387 | .5409 | .5325 | .5373 | .5408 | .5389 | −.2036 |
| 64 | .5656 | .5648 | .5698 | .5686 | .5659 | .5667 | −.2036 |

TCIRC

This program generates the Delta radii and mean radius data from the raw data file.

Sample delta radii file generated by running TCIRC to process a Mode 100 raw data file.

| DELTA RADII DATA | | | |
|---|---|---|---|
| STATION | DELTA R (IN) | STATION | DELTA R (IN) |
| 1 | .404594 | 33 | .141884 |
| 2 | .422974 | 34 | .472005 |
| 3 | .429680 | 35 | .166100 |
| 4 | .448425 | 36 | .137375 |
| 5 | .537027 | 37 | .083130 |
| 6 | .426178 | 38 | .120850 |
| 7 | .465637 | 39 | .151794 |
| 8 | −.092903 | 40 | .111031 |
| 9 | −.223000 | 41 | −.007713 |
| 10 | −.241699 | 42 | .004990 |
| 11 | −.291389 | 43 | −.039963 |
| 12 | −.290337 | 44 | −.017235 |
| 13 | −.287041 | 45 | −.127075 |
| 14 | −.323456 | 46 | .001350 |
| 15 | −.318466 | 47 | −.041061 |
| 16 | −.307365 | 48 | −.070770 |
| 17 | −.272301 | 49 | −.025131 |
| 18 | −.146255 | 50 | −.062531 |
| 19 | −.100021 | 51 | −.050972 |
| 20 | −.040443 | 52 | −.097069 |
| 21 | −.030327 | 53 | −.204231 |
| 22 | −.079399 | 54 | −.230232 |
| 23 | −.011055 | 55 | −.306633 |
| 24 | −.018539 | 56 | −.379578 |
| 25 | −.016090 | 57 | −.496948 |
| 26 | −.041588 | 58 | −.544052 |
| 27 | .092514 | 59 | −.390793 |
| 28 | .163994 | 60 | .240555 |
| 29 | .143784 | 61 | .203018 |
| 30 | .119293 | 62 | .211510 |
| 31 | .110962 | 63 | .314003 |
| 32 | .102676 | 64 | .397018 |

Average Radius—21.00926 Feet

PRNDR

This program is used to generate the same output on the printer as obtained by running TCIRC. It uses the output (Delta radii) file from TCIRC. This program can also be used to print the results from files generated by direct radius measurements.

EBCRD

This program is used to manually input direct radius measurements at 64 stations. It will prompt the user to insert the data file name, the date, the design radius in decimal feet and a single line identifier. It will then present a menu for inputting the data, this menu is:

CHOOSE INPUT FORMAT BY TYPING:

1. TO USE DECIMAL FEET
2. TO USE DECIMAL MILLIMETERS
3. TO USE CONSTANT INTEGER FEET PLUS DECIMAL INCHES
4. TO USE CONSTANT INTEGER FEET PLUS INTEGER INCHES PLUS INTEGER NUMBER OF 1/32 OF AN INCH

If either 1 or 2 is chosen the user may choose to input data with or without a constant radius. For the 3 and 4 options a constant radius in feet is always used.

EBPRD

This program should be utilized after EBCRD. It prints the radius data in millimeters, decimal feet and decimal inches.

| MEASURED RADIUS DATA FILE NAME = L18.E1 DESIGN RADIUS = 21.00000 | | | | | |
|---|---|---|---|---|---|
| STATION | RADIUS (FT) | STATION | RADIUS (mm) | STATION | RADIUS (in) |
| 1 | 21.0734 | 1 | 6423.18 | 1 | 252.8813 |
| 2 | 21.0734 | 2 | 6423.18 | 2 | 252.8813 |
| 3 | 21.0702 | 3 | 6422.18 | 3 | 252.8419 |
| 4 | 21.0700 | 4 | 6422.18 | 4 | 252.8405 |
| 5 | 21.0672 | 5 | 6421.29 | 5 | 252.8066 |
| 6 | 21.0641 | 6 | 6420.33 | 6 | 252.7687 |
| 7 | 21.0762 | 7 | 6421.29 | 7 | 252.8066 |
| 8 | 21.0134 | 8 | 6404.90 | 8 | 252.1613 |
| 57 | 20.9984 | 57 | 6400.31 | 57 | 251.9808 |
| 58 | 20.9944 | 58 | 6399.08 | 58 | 251.9324 |
| 59 | 21.0105 | 59 | 6403.99 | 59 | 252.1258 |
| 60 | 21.0623 | 60 | 6419.79 | 60 | 252.1258 |
| 61 | 21.0626 | 61 | 6419.87 | 61 | 252.7577 |
| 62 | 21.0631 | 62 | 6420.05 | 62 | 252.7577 |
| 63 | 21.0730 | 63 | 6423.06 | 63 | 252.8764 |
| 64 | 21.0769 | 64 | 6424.22 | 64 | 252.9222 |

EBERD

If the data entry (using EBCRD) caused erroneous data (determined by reviewing the print-out from EBPRD) then EBERD can be used to change individual station items. The resulting data can be written to a new file or to the same file.

EBRAD

Once the direct measurement data file has been accurately created, EBRAD is used to determine the best fit (i.e., average) radius and to create a file with this quantity and the 64 values of Delta radii (in inches) from the best fit curve. EBRAD will also output this data to the printer or screen. The program PRNDR can also be used to print this data at a later time.

PLOTR

This program will plot Delta radii data as generated by TCIRC or EBRAD. It will plot one or two files (one as a connected line with squares designating the points and the second with + sign designating the points). If the operator responds to the prompt for the second file name with simply an "enter" then only a connected plot will be generated.

TAVG

This program will take up to five Delta radii files as generated by TCIRC or EBRAD and construct a Delta radii file which is the average of the input files. It will print out the input files, the average file and, for each station, will print the largest deviation of the Delta Radii. These are all done in tabular form. The header on this table will print all the file the mean radii, the maximum of the largest deviations in Delta radii (as well as the station number that this maximum occured at) and the average of the magnitude of the largest deviations in Delta radii. A typical output is shown below.

| 1ST = | JL18.CR1 | FOR WHICH MEAN RADIUS = | 21.00926 FEET |
|---|---|---|---|
| 2ND = | JL18.CR2 | FOR WHICH MEAN RADIUS = | 21.00937 FEET |
| 3RD = | JL18.CR3 | FOR WHICH MEAN RADIUS = | 21.00926 FEET |
| 4TH = | JL18.CR4 | FOR WHICH MEAN RADIUS = | 21.00937 FEET |
| 5TH = | JL18.CR5 | FOR WHICH MEAN RADIUS = | 21.00947 FEET |

AVERAGE FILE = JL18.CPA
AVERAGE MEAN RADIUS OF 5 FILES = 21.00935 FEET
THE LARGEST MEAN RADIUS DIFFERENCE = 0.0025 INCHES
THE LARGEST DELTA RADII DIFFERENCE IS 0.024 INCHES AT STATION NUMBER 37
THE AVG MAGNITUDE OF THE DELTA RADII DIFFERENCE IS 0.0151 INCHES

TABLE OF INDIVIDUAL, AVERAGE & MAX DIFFERENCE OF DELTA RADII (INCHES) STATION

| # | 1st | 2nd | 3rd | 4th | 5th | Avg | Max Diff |
|---|---|---|---|---|---|---|---|
| 1 | 0.4046 | 0.4084 | 0.4132 | 0.4110 | 0.4056 | 0.4086 | 0.0086 |
| 2 | 0.4230 | 0.4230 | 0.4323 | 0.4266 | 0.4244 | 0.4259 | 0.0094 |
| 3 | 0.4297 | 0.4253 | 0.4387 | 0.4306 | 0.4324 | 0.4313 | 0.0134 |
| 4 | 0.4484 | 0.4417 | 0.4572 | 0.4453 | 0.4507 | 0.4487 | 0.0155 |
| 5 | 0.4370 | 0.4287 | 0.4480 | 0.4307 | 0.4393 | 0.4368 | 0.0193 |
| 6 | 0.4262 | 0.4173 | 0.4360 | 0.4164 | 0.4287 | 0.4249 | 0.0197 |
| 7 | 0.4656 | 0.4563 | 0.4732 | 0.4520 | 0.4654 | 0.4625 | 0.0213 |
| 8 | 0.0929 | −0.1007 | −0.0879 | −0.1076 | −0.0927 | −0.0963 | 0.0198 |
| 57 | −0.4969 | −0.4788 | −0.5941 | −0.4843 | −0.4958 | −0.4902 | 0.0182 |
| 58 | −0.5441 | −0.5221 | −0.5391 | −0.5295 | −0.5427 | −0.5355 | 0.0220 |
| 59 | −0.3908 | −0.3702 | −0.2864 | −0.3737 | −0.3898 | −0.3822 | 0.0206 |
| 60 | 0.2406 | 0.2613 | 0.2467 | 0.2577 | 0.2420 | 0.2497 | 0.0208 |
| 61 | 0.2030 | 0.2225 | 0.2121 | 0.2203 | 0.2056 | 0.2127 | 0.0196 |
| 62 | 0.2115 | 0.2284 | 0.2205 | 0.2263 | 0.2125 | 0.2198 | 0.0168 |
| 63 | 0.3140 | 0.3256 | 0.3220 | 0.2355 | 0.3137 | 0.3201 | 0.0120 |
| 64 | 0.3970 | 0.4045 | 0.4048 | 0.4053 | 0.3969 | 0.4017 | 0.0083 |

PLOTC

This will plot one Delta radii file as a connected line with squares to indicate the points and will also show the range of points as defined by up to 5 other files of Delta radii. The file names are entered from prompts and comments may be printed as in PLOTR. This is typically set to plot the average of files as the reference file with the individual files from which the average was obtained used to dictate the range data.

Figure 15:
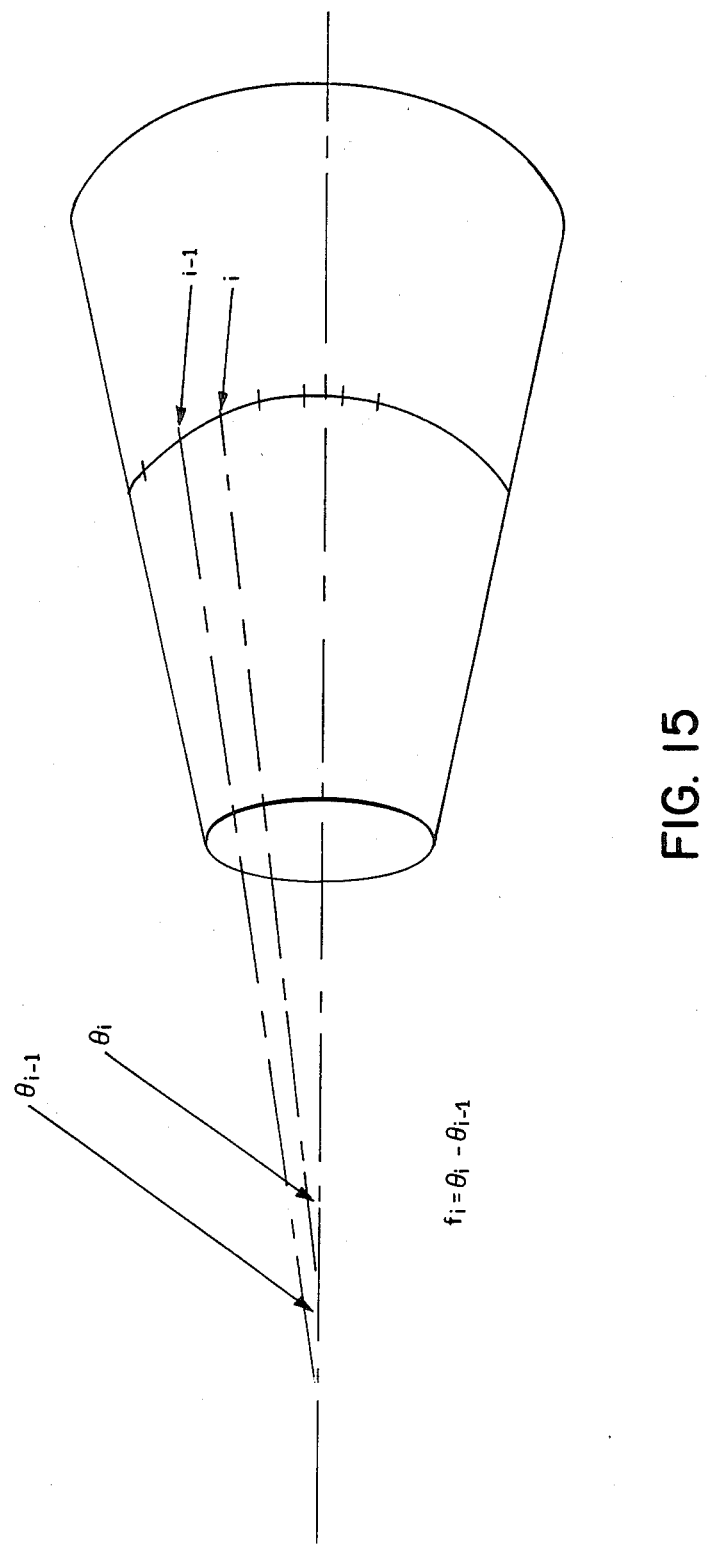
FIG. 15 is a schematic view of an alternative bridge assembly for the measurement of a sloping surface.
Figures 16, 17:
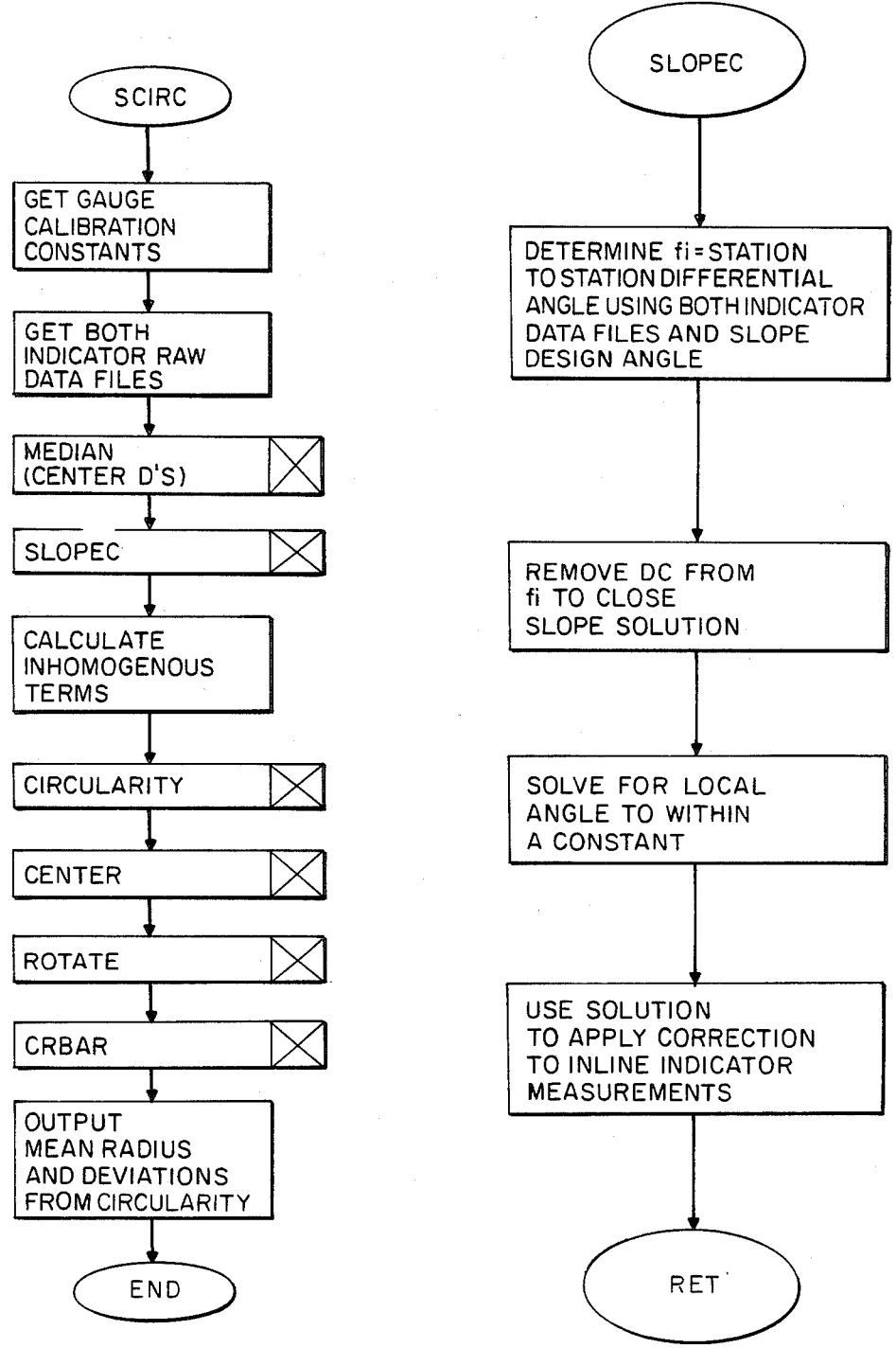
FIGS. 16 and 17 are flow charts for the programs for the data station for sloping surfaces.

In an alternative embodiment the method is modified for measuring sloping surfaces. More particularly, the circularity of a closed curved surface surrounding a reference axis may be determined where the surface of interest is not parallel to the reference axis, but has some design angle ($\theta_D$) with respect to this axis that may vary as a function of position and additionally may vary small random amounts from the design value. An example of this type of surface is a nominally conical section as shown in FIG. 15. The flow charts for the basic programs for measuring the circularity of sloping surfaces are shown in FIGS. 16 and 17. These programs are also set forth in the Appendix.

The technique as described for the preferred embodiment is used with the addition of a correction to the $b_i$'s to provide the value of $b_i$ that would be obtained if the measurement were actually in the plane normal to the reference axis.

This process is effected by the determination of the change in angle associated with slope between station i and i−1 and determining the differential angle ($f_i$). By measuring differential angle ($f_i$) at each station then $$\theta_i - \theta_{i-1} = f_i.$$

Thus:

$$\theta_1 = N + f_1,$$

$$\theta_2 = \theta_1 + f_2 = \theta_N + f_1 + f_2$$

$$\theta_i = \theta_N + \sum_{J=1}^{i} f_J,$$

and $$\theta_N = \theta_N + \sum_{J=1}^{N} f_J$$

For perfect measurements $$\sum_{J=1}^{N} f_J = 0$$

For actual measurements, the closure property of the closed surface is invoked by correcting each $f_i$:

$$f'_i = f_i - \frac{1}{N} \sum_{J=1}^{N} f_J$$

For each station:

$$b_i \text{ (corrected)} = b_i \frac{\cos \beta_i}{\cos \alpha_i}$$

where $$\beta_i = \theta_{Di-1} + f'_i$$

$$\alpha_i = \theta_{DN} + \sum_{J=1}^{i} f'_J$$

$\theta_{Di}$ = Design angle at station i

In this alternative embodiment the gauge is modified to include an indicator to measure the displacement of the surface. Referring to FIG. 4, an indicator 70 (shown in dotted lines) is secured to the bridge 12 behind the indicator 34 to measure relative slope on the surface of interest, that is, in a plane incorporating the reference axis and the first indicator. The indicator 70 (which is the same as indicator 34) may be placed on the upwardly sloping surface or the downwardly sloping surface with reference to the indicator 34 at station i. Also the support leg 40 is offset to hold the gauge nominally in a plane perpendicular to the reference axis and also moved to a distance behind leg 38 equal to the distance between the indicators 34 and 70. The data provided by the indicators 34 and 70 is used to determine the slope at station i and i-1.

If the reference axis is normal to the horizontal as defined by gravity, such as with a suspended hull, then a level to position the indicator in the plane normal to the reference axis may be used.

Having described our invention, what we now claim is:

1. A method of determining the shape of a surface surrounding a reference axis which includes:
   (a) establishing a reference plane which plane is perpendicular to the reference axis and which plane extends through the surface, the intersection of the plane with the surface defining a curved path;
   (b) dividing the path into a plurality of contiguous segments with the junction of the adjacent segments defining stations;
   (c) measuring the curvature of each station;
   (d) invoking the closure property of the surface by forcing the mathematical solution to be continuous for a complete revolution as is the physical surface; and
   (e) producing a deviation of each of the stations from the nominal shape of interest.

2. The method of claim 1 wherein invoking the closure property of the surface includes:
   digitizing the general curvature equation $$K(x) = \frac{y''}{[1 + (y')^2]^{3/2}}$$

and
   solving the result thereof to determine the deviations from the nominal shape.

3. The method of claim 1 wherein invoking the closure property of the surface includes:
   using perturbation theory about the nominal shape;
   digitizing the results; and
   solving the same to determine the deviations from nominal shape.

4. The method of claim 1 wherein the surface is a curved surface and the circularity of the surface is determined which includes:
   dividing the path into a plurality of equal length contiguous segments;
   measuring the deviation $b_i$ of each station from a chord which extends between the preceeding and succeeding stations adjacent to the station;
   calculating the curvature at each station;
   invoking the closure property of the measured surface; and
   producing both a deviation, $\delta$, of each of the stations from the best fit circle and the mean radius, R, of the surface which is the radius of the best fit circle.

5. The method of claim 4 which includes:
   taking a plurality of deviation measurements $b_i$ at each station and providing a weighted average $\bar{b}_i$ of said measurements.

6. The method of claims 4 or 5 which includes:
   calculating the curvature, $K_i$, at each station in accordance with the equation $$K_i = \frac{2b_i}{A^2 + b^2_i}$$

where:
   i = the station number
   A = one-half the length of said chord for each station;
   solving the equation:

$$r_{i+1} + r_{i-1} - 2(\cos \Delta\theta)r_i = (\Delta\theta)^2 R_j^2 (K_i - K_j)$$

where:

$$\Delta\theta = \frac{2\pi}{\text{number of stations}}$$

i = station number
   $K_j$ = median $K_i$
   $R_j = 1/K_j$
   $r_i = (R_i - R_j)$, and
   $R_i$ = represents the surface measured.

7. The method of claim 6 where invoking the closure property includes:
   preprocessing the inhomogenous terms $(K_i - K_j)$.

8. The method of claim 7 wherein the preprocessing of $(K_i - K_j)$ includes:
   (a) performing a digital Fourier transform on $(K_i - K_j)$;
   (b) setting the fundamental Fourier component equal to zero; and
   (c) performing a digital inverse Fourier transform to produce the preprocessed $(K_i - K_j)$.

9. The method of claim 7 which includes:
   determining the best fit circle by employing the solutions for $R_i$ in a least square fit algorithm to produce both the deviation $\delta_i$ of each of the stations from the best fit circle and the mean radius R of said surface which is the radius of the best fit circle.

10. The method of claims 4 or 7 which includes:
    determining the mean radius R of said curved surface by evaluating the equation $$R = \frac{G}{2\pi} - \frac{1}{2G} \Sigma_i \frac{\delta_i^2}{\Delta\theta}$$

where (G) is the girth measurement of said surface along said path.

11. The method of claims 4 or 5 wherein the surface containing the closed curved path is not parallel to the reference axis, but is at an angle with respect to said axis and which includes:
    providing a value of $b_i$ that would be obtained if the measurement were made in the plane normal to the reference axis by:
    measuring the differential angle ($f_i$) associated with the slope between stations i and i−1

$$\theta_i - \theta_{i-1} = f_i,$$

Thus:

$\theta_1 = \theta_N + f_1,$ $\theta_2\theta_1 + f_2 = \theta_N + f_1 + f_2,$ $$\theta_i = \theta_N + \sum_{J=1}^{i} f_J,$$

and $$\theta_N = \theta_N + \sum_{J=1}^{N} f_J$$

invoking the closure property of the closed surface by forcing the mathematical solution to be continuous for a complete revolution as is the physical surface by correcting each $f_i$:

$$f_i = f_i - \frac{1}{N} \sum_{J=1}^{N} f_J$$

wherein for each station:

$$b_i \text{(corrected)} = b_i \frac{\cos \beta_i}{\cos \alpha_i}$$

whereby $\beta_i = \theta_{Di-1} + f_i$ $$\alpha_i = \theta_{DN} + \sum_{J=1}^{i} f_J$$

$\theta_{Di}$ = Design angle at station i.

12. The method of claim 11 wherein the reference axis is normal to horizontal as defined by gravity and which includes:
 positioning the indicator in the plane normal to the reference axis.

13. The method of claim 4 wherein the curved surface has an opening therein and which includes:
 providing a temporary measurement surface in said opening.

14. A method of determining the mean radius of a curved surface surrounding a reference axis which includes:
 (a) establishing a reference plane which plane is perpendicular to the reference axis and which plane extends through the surface, the intersection of the plane with the surface defining a curved path;
 (b) dividing the path into a plurality of contiguous segments with the junction of adjacent segments defining stations;
 (c) producing both a deviation of each of the stations from the best fit circle and the mean radius (R) which is the radius of the best fit circle; and
 (d) determining the mean radius (R) of said curved surface by evaluating the equation $$R = \frac{G}{2\pi} - \frac{1}{2G} \Sigma_i \frac{\delta_i^2}{\Delta \theta_i}$$

where G is the girth measurement of said surface along said path.

15. The method of claim 14 wherein the segments are equal length segments and which includes:
 calculating the curvature at each station.

16. The method of claim 14 which includes:
 calculating the circularity of the curved surface by dividing the path into a plurality of equal length continuous segments;
 measuring the deviation $b_i$ of each station from a chord which extends between the preceeding and succeeding stations adjacent to the station;
 calculating the curvature at each station;
 invoking the closure property of the measured surface; and
 producing both a deviation, $\delta$, of each of the stations from the best fit circle and the mean radius, R, of the surface which is the radius of the best fit circle.

17. The method of claim 8 which includes:
 determining the best fit circle by employing the solutions for $R_i$ in a least square fit algorithm to produce both the deviation $\delta_i$ of each of the stations from from the best fit circle and the mean radius R of said surface which is the radius of the best fit circle.

18. The method of claim 8 which includes:
 determining the mean radius $\overline{R}$ of said curved surface by evaluating the equation $$R = \frac{G}{2\pi} - \frac{1}{2G} \Sigma_i \frac{\delta_i^2}{\Delta \theta}$$

where (G) is the girth measurement of said surface along said path.

19. The method of claim 8 wherein the surface containing the closed curved path is not parallel to the reference axis, but is at an angle with respect to said axis and which includes:
 providing a value of $b_i$ that would be obtained if the measurement were made in the plane normal to the reference axis by:
 measuring the differential angle ($f_i$) associated with the slope between stations i and i−1

$\theta_i - \theta_{i-1} = f_i,$

Thus:

$\theta_1 \theta_N + f_1,$ $\theta_2 = \theta_1 + f_2 = \theta_N + f_1 + f_2,$ $$\theta_i = \theta_N + \sum_{J=1}^{i} f_J,$$

and $$\theta_N = \theta_N + \sum_{J=1}^{N} f_J$$

invoking the closure property of the closed surface by forcing the mathematical solution to be continuous for a complete revolution as is the physical surface wherein for each station:

$$b_i \text{(corrected)} = b_i \frac{\cos \beta_i}{\cos \alpha_i}$$

whereby $\beta_i = \theta_{Di-1} + f_i$ $$\alpha_i = \theta_{DN} + \sum_{J=1}^{i} f_J$$

$\theta_{Di}$ = Design angle at station i.

* * * * *